(12) United States Patent
Krisher

(10) Patent No.: US 6,319,132 B1
(45) Date of Patent: Nov. 20, 2001

(54) MOTOR VEHICLE TORQUE TRANSFER CASE WITH INTEGRAL CONSTANT VELOCITY (CV) JOINT

(75) Inventor: James A. Krisher, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/071,260

(22) Filed: May 1, 1998

(51) Int. Cl.$^7$ .............................. F16J 15/40; F16D 3/16
(52) U.S. Cl. ..................... 464/143; 474/903; 464/906; 464/175; 277/423; 277/636
(58) Field of Search .................... 474/102, 101, 474/903, 69, 70; 464/51, 175, 55, 173, 139, 140, 142, 143, 906; 277/636, 423, 549

(56) References Cited

U.S. PATENT DOCUMENTS

| | | | |
|---|---|---|---|
| 3,941,199 | * 3/1976 | Williams | 180/44 |
| 4,289,213 | 9/1981 | Seaman . | |
| 4,303,400 | 12/1981 | Yano et al. . | |
| 4,464,143 | * 8/1984 | Bowyer | 464/906 |
| 4,632,207 | * 12/1986 | Moore | 180/247 |
| 4,911,609 | * 3/1990 | Anderson et al. | 415/174.2 |
| 5,116,293 | 5/1992 | Reuter . | |
| 5,159,847 | * 11/1992 | Williams et al. | 74/337.5 |
| 5,212,995 | * 5/1993 | Robinson et al. | 74/44 |
| 5,226,860 | 7/1993 | Baxter, Jr. et al. . | |
| 5,599,249 | 2/1997 | Zalewski et al. . | |
| 5,609,540 | 3/1997 | Brissenden et al. . | |
| 5,632,683 | * 5/1997 | Fukumura et al. | 464/906 |
| 5,634,863 | 6/1997 | Brissenden et al. . | |
| 5,687,972 | * 11/1997 | Petrak | 277/38 |
| 5,692,590 | * 12/1997 | Iihara et al. | 180/247 |
| 5,704,444 | * 1/1998 | Showalter | 180/247 |

* cited by examiner

Primary Examiner—Lynne H. Browne
Assistant Examiner—Kenneth Thompson
(74) Attorney, Agent, or Firm—Scott M. Oldham; Hahn, Loeser + Parks, LLP

(57) ABSTRACT

A motor vehicle torque transfer case with integral constant velocity (CV) joint including a constant velocity (CV) bell, a chain sprocket, a speed sensor tone wheel, a chain sprocket splined to the chain sprocket spindle, two (2) support bearings, a single seal, a constant velocity (CV) inner race and cage assembly, a front output shaft, and a constant velocity (CV) boot. The constant velocity (CV) bell, the chain sprocket spindle and the speed tone wheel are preferably of one-piece construction. The constant velocity (CV) joint is preferably of a double offset plunging design, although other designs for the constant velocity (CV) joint could be utilized if desired. The spline connecting the chain sprocket to the chain sprocket spindle is preferably a slip fit and a drawn cup needle roller bearing is pressed into the torque transfer case housing. The ball bearing is pressed onto the constant velocity (CV) bell and is retained with a first snap ring and an assembly including the constant velocity (CV) joint and the ball bearing is installed into the torque transfer case housing and is secured with a second snap ring.

18 Claims, 1 Drawing Sheet

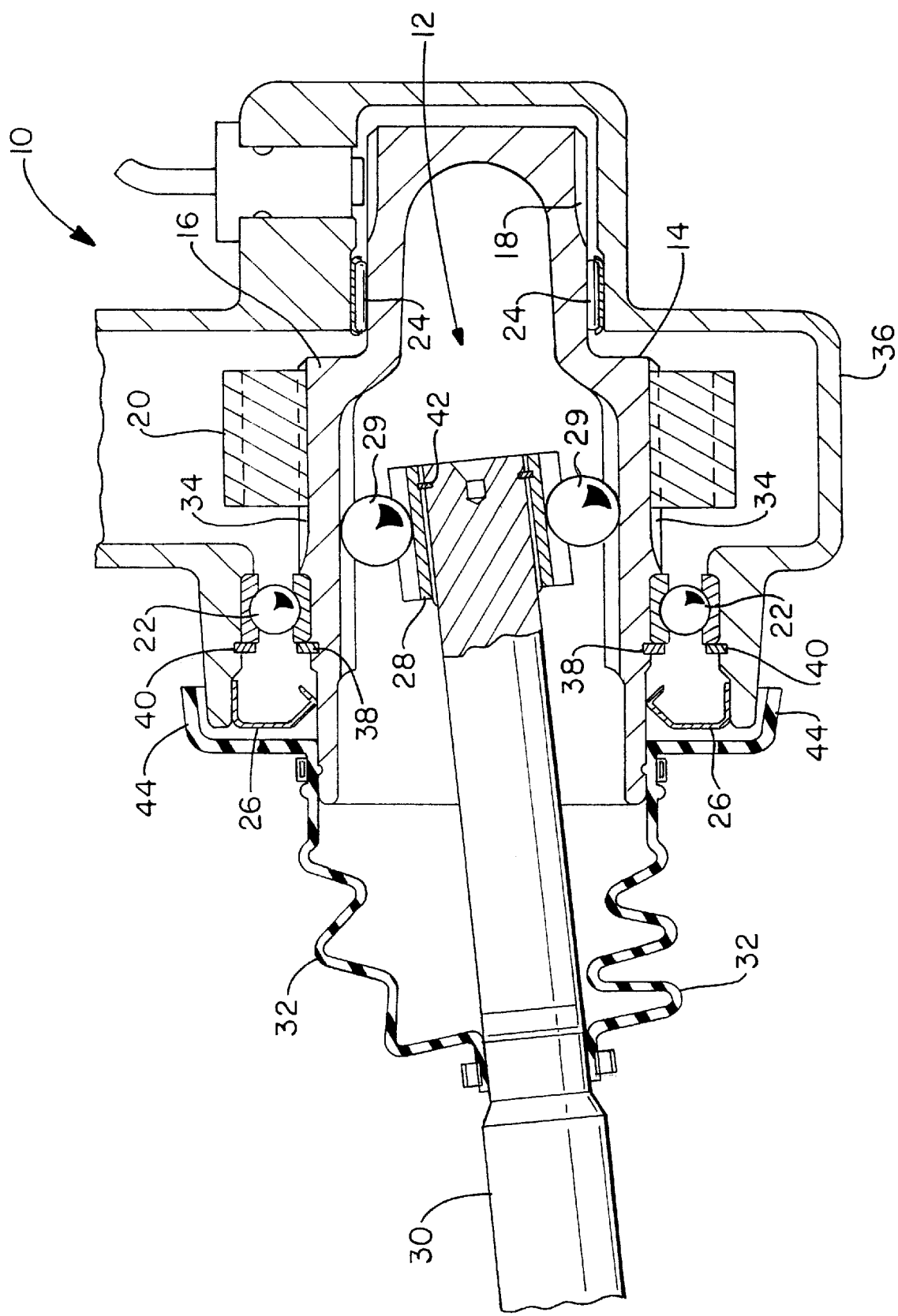

MOTOR VEHICLE TORQUE TRANSFER CASE WITH INTEGRAL CONSTANT VELOCITY (CV) JOINT

BACKGROUND AND SUMMARY OF THE INVENTION

The present invention relates generally to a new and novel motor vehicle torque transfer case with integral constant velocity (CV) joint. More particularly, the present invention relates to a new and novel motor vehicle torque transfer case with integral constant velocity (CV) joint which permits integral length adjustment.

Four-wheel drive motor vehicles are becoming increasingly popular. Recently, certain motor vehicles have been provided with "full-time" four-wheel drive systems capable of operation on hard pavement at highway speeds. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle.

Known prior "full-time" four-wheel drive systems have generally required three (3) joints of various designs per prop shaft, such as a slip joint to accommodate prop length variation and two (2) joints to accommodate angularity variation between the torque transfer case and the drive axle. Such known prior art designs are more complex, and thus more costly, than desired.

A preferred embodiment of the present invention is, therefore, directed to a motor vehicle torque transfer case with integral constant velocity (CV) joint including a constant velocity (CV) bell, a chain sprocket spindle, a speed sensor tone wheel, a chain sprocket splined to the chain sprocket spindle, two (2) support bearings, a single seal, a constant velocity (CV) inner race and cage assembly, a front output prop or shaft, and a constant velocity (CV) boot or cover. The constant velocity (CV) bell, the chain sprocket spindle and the speed sensor tone wheel are preferably of one-piece construction. The constant velocity (CV) joint is preferably of a double offset plunging design, although other designs for the constant velocity (CV) joint could be utilized if desired. The spline connecting the chain sprocket to the chain sprocket spindle is preferably a slip fit and a bearing, such as a drawn cup needle roller bearing, is pressed into the torque transfer case housing. A ball bearing is pressed onto the constant velocity (CV) bell and is retained with a first snap ring and an assembly including the constant velocity (CV) joint and the ball bearing is installed into the torque transfer case housing and is secured with a second snap ring. The seal is pressed into position and the constant velocity (CV) joint boot or cover is installed to complete the motor vehicle torque transfer case with integral constant velocity (CV) joint assembly. The front output prop or shaft is retained in the constant velocity (CV) inner race by an expanding ring and the front output prop or shaft is free to adjust to any angle required by the front axle location. The motor vehicle torque transfer case with integral constant velocity (CV) joint design is thus self-compensating for dimensional variations due to tolerances, including variations in the axle position and the front output prop or shaft length.

Other advantages and novel features of the present invention will become apparent in the following detailed description of the invention when considered in conjunction with the accompanying drawing.

BRIEF DESCRIPTION OF THE DRAWINGS

FIG. 1 is a side elevational view, partly in cross-section, of a motor vehicle torque transfer case with integral constant velocity (CV) joint in accordance with a preferred embodiment of the present invention.

DETAILED DESCRIPTION OF THE DRAWINGS

In the following detailed description of a preferred embodiment of the present invention, reference is made to the accompanying drawing which, in conjunction with this detailed description, illustrates and describes a preferred embodiment of a motor vehicle torque transfer case with integral constant velocity (CV) joint, generally identified by reference number 10, in accordance with the present invention. Referring to FIG. 1, which illustrates a side elevational view, partly in cross-section, of motor vehicle torque transfer case with integral constant velocity (CV) joint 10 in accordance with a preferred embodiment of the present invention, motor vehicle torque transfer case with integral constant velocity (CV) joint 10 generally includes constant velocity (CV) joint 12, constant velocity (CV) bell 14, chain sprocket spindle 16, speed sensor tone wheel 18, chain sprocket 20 which is splined to chain sprocket spindle 16, two (2) support bearings 22 and 24, a single seal 26, constant velocity (CV) inner race and cage assembly 28, front output prop or shaft 30 and constant velocity (CV) joint boot or cover 32. Constant velocity (CV) bell 14, chain sprocket spindle 16 and speed sensor tone wheel 18 are preferably of one-piece construction.

As shown in FIG. 1, constant velocity (CV) joint 12 is preferably of a double offset plunging design, although other designs for constant velocity (CV) joint 12 could be utilized if desired. Splines 34 connecting chain sprocket 20 to chain sprocket spindle 16 preferably provide for a slip fit between chain sprocket 20 and chain sprocket spindle 16. Support bearing 24, which is preferably a drawn cup needle roller bearing, is pressed into transfer case housing 36. Support bearing 22, which is preferably a ball bearing, is pressed onto the outside diameter of constant velocity (CV) bell 14 and is retained with first snap ring 38. The assembly including constant velocity (CV) joint 12 and support bearing 22 is installed into transfer case housing 36 and is preferably secured with second snap ring 40. Seal 26 is pressed into position and front output prop or shaft 30 and constant velocity (CV) joint boot or cover 32 are installed to complete the assembly of motor vehicle torque transfer case with integral constant velocity (CV) joint 10.

Front output prop or shaft 30 is retained in constant velocity (CV) inner race and cage assembly 28 by expanding ring 42 and front output shaft prop or shaft 30 is free to adjust to any angle required by the front axle location through interaction of a plurality of torque transmission balls 29 positioned between inner race in cage assembly 28 and constant velocity (CV) bell 14. Thus, the design of motor vehicle torque transfer case with integral constant velocity (CV) joint 10 is self-compensating for dimensional variations due to tolerances, including variations in the axle position and the front output prop or shaft length.

Thus, motor vehicle torque transfer case with integral constant velocity (CV) joint 10 provides several advantages over known prior motor vehicle torque transfer case designs, including reducing the complexity of the motor transfer case and front output prop or shaft assembly. In addition, attachment of the front output prop or shaft to the torque transfer case eliminates the need for companion flanges and related componentry. Also, by utilizing a constant velocity (CV)

joint having a plunging design, the need for a front output prop or shaft slip joint is eliminated. Fabricating constant velocity (CV) bell 14, chain sprocket spindle 16 and speed sensor tone wheel 18 as an integral one-piece unit reduces componentry, reduces cost and improves the dimensional accuracy. Motor vehicle torque transfer case with integral constant velocity (CV) joint 10 can be serviced and/or replaced without disassembling the torque transfer case and joint lubrication of constant velocity (CV) joint 12 is independent of the torque transfer case. Motor vehicle torque transfer case with integral constant velocity (CV) joint 10 permits the length of the front output prop or shaft to be extended, which minimizes joint angles and resultant wear. Constant velocity (CV) joint 12 also preferably includes an integral speed sensor tone wheel 18 for a speed sensor and the design of constant velocity (CV) bell 14 permits the inner races and the exterior splines to be fabricated by a net-forming process to further reduce cost. Furthermore, constant velocity (CV) joint boot or cover 32 can be formed with an integral slinger 44, as shown, for additional protection against the entry of dirt, debris and other foreign materials into motor vehicle torque transfer case with integral constant velocity (CV) joint 10.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle torque transfer case with integral constant velocity (CV) joint comprising:
    a constant velocity (CV) joint including an inner race and a constant velocity (CV) bell, said constant velocity (CV) bell having an integral chain sprocket spindle and an integral speed sensor tone wheel;
    a chain sprocket rotatably attached to said integral chain sprocket spindle of said constant velocity (CV) bell;
    at least one support bearing which supports said constant velocity (CV) joint in relation to a transfer case housing;
    a front output prop or shaft which is rotatably attached to said inner race of said constant velocity (CV) joint; and
    a plurality of torque transfer balls positioned between said to said inner race of said constant velocity (CV) joint and said constant velocity (CV) bell.

2. The motor vehicle torque transfer case with integral constant velocity (CV) joint in accordance with claim 1, wherein the outside diameter of said integral chain sprocket spindle includes a plurality of splines and said chain sprocket is attached to said splines on said outside diameter of said integral chain sprocket spindle.

3. The motor vehicle torque transfer case with integral constant velocity (CV) joint in accordance with claim 1, wherein the outside diameter of said integral chain sprocket spindle includes a plurality of splines and said chain sprocket is attached to said splines on said outside diameter of said integral chain sprocket spindle by a slip fit to permit relative axial movement between said chain sprocket spindle and said chain sprocket.

4. The motor vehicle torque transfer case with integral constant velocity (CV) joint in accordance with claim 1, wherein said constant velocity (CV) bell, said integral chain sprocket spindle, and said integral speed sensor tone wheel are formed in a one-piece construction by a net-forming process.

5. The motor vehicle torque transfer case with integral constant velocity (CV) joint in accordance with claim 1, wherein said constant velocity (CV) joint is of a plunging design.

6. The motor vehicle torque transfer case with integral constant velocity (CV) joint in accordance with claim 1, wherein said constant velocity (CV) joint is of a double offset plunging design.

7. The motor vehicle torque transfer case with integral constant velocity (CV) joint in accordance with claim 1, wherein said at least one support bearing to support said constant velocity (CV) joint in relation to said transfer case housing includes a first support bearing positioned between said constant velocity (CV) bell and said transfer case housing and a second support bearing positioned between said constant velocity (CV) bell and said transfer case housing.

8. The motor vehicle torque transfer case with integral constant velocity (CV) joint in accordance with claim 7, wherein said first support bearing is a ball bearing.

9. The motor vehicle torque transfer case with integral constant velocity (CV) joint in accordance with claim 7, wherein said first support bearing is a ball bearing and is retained to said constant velocity (CV) bell by a snap ring.

10. The motor vehicle torque transfer case with integral constant velocity (CV) joint in accordance with claim 7, wherein said first support bearing is a ball bearing and is retained to said constant velocity (CV) bell by a first snap ring and an assembly including said constant velocity (CV) bell and said first support bearing is retained in said transfer case housing by a second snap ring.

11. The motor vehicle torque transfer case with integral constant velocity (CV) joint in accordance with claim 7, wherein said second support bearing is a drawn cup needle roller bearing.

12. The motor vehicle torque transfer case with integral constant velocity (CV) joint in accordance with claim 7, wherein said second support bearing is a drawn cup needle roller bearing which is pressed into said transfer case housing.

13. The motor vehicle torque transfer case with integral constant velocity (CV) joint in accordance with claim 1, wherein said front output prop or shaft is retained to said inner race of said constant velocity (CV) joint by an expanding ring.

14. The motor vehicle torque transfer case with integral constant velocity (CV) joint in accordance with claim 1, further including a flexible constant velocity (CV) joint boot or cover which provides protection and precludes the entry of dirt, debris and other foreign materials into said motor vehicle torque transfer case with integral constant velocity (CV) joint.

15. The motor vehicle torque transfer case with integral constant velocity (CV) joint in accordance with claim 14, wherein said flexible constant velocity (CV) joint boot or cover includes an integral slinger which provides additional protection against the entry of dirt, debris and other foreign materials into said motor vehicle torque transfer case with integral constant velocity (CV) joint.

16. The motor vehicle torque transfer case with integral constant velocity (CV) joint in accordance with claim 3, wherein said constant velocity (CV) bell, said integral chain sprocket spindle and said integral speed sensor tone wheel are formed in a one-piece construction by a net-forming process.

17. The motor vehicle torque transfer case with integral constant velocity (CV) joint in accordance with claim 16, wherein said constant velocity (CV) joint is of a plunging design.

18. The motor vehicle torque transfer case with integral constant velocity (CV) joint in accordance with claim 16, wherein said constant velocity (CV) joint is of a double offset plunging design.

* * * * *